United States Patent
Shimamura

(10) Patent No.: US 6,950,992 B2
(45) Date of Patent: Sep. 27, 2005

(54) EXTERNAL-CHARACTER FONT CREATION SYSTEM AND PROGRAM RECORDING MEDIUM THEREFOR

(75) Inventor: Kaoru Shimamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 811 days.

(21) Appl. No.: 09/817,224

(22) Filed: Mar. 27, 2001

(65) Prior Publication Data

US 2002/0057271 A1 May 16, 2002

(30) Foreign Application Priority Data

Nov. 15, 2000 (JP) ........................................ 2000-348187

(51) Int. Cl.$^7$ .............................................. G06F 17/24
(52) U.S. Cl. ...................................... 715/781; 715/542
(58) Field of Search ........................ 715/542; 345/467; 358/1.11; 709/246

(56) References Cited

U.S. PATENT DOCUMENTS

| 5,699,524 | A | * | 12/1997 | Ooishi et al. | 709/246 |
| 5,721,812 | A | * | 2/1998 | Mochizuki | 358/1.11 |
| 5,802,538 | A | * | 9/1998 | Ooishi | 715/542 |
| 6,320,587 | B1 | * | 11/2001 | Funyu | 345/467 |

FOREIGN PATENT DOCUMENTS

| JP | 6-259426 | 9/1994 |
| JP | 7-93307 | 4/1995 |
| JP | 8-179905 | 7/1996 |

* cited by examiner

*Primary Examiner*—Heather R. Herndon
*Assistant Examiner*—Doug Hutton
(74) *Attorney, Agent, or Firm*—Staas & Halsey LLP

(57) ABSTRACT

An external-character font creation system is provided which includes: a display unit displaying an external-character code registration screen which is used when a master code is registered in an external-character code table that shows a correspondence between an external-character code of an external character to be registered and a master code; and an edit unit registering a master code corresponding to an external-character code in the external-character code table; a font selecting section selecting a plurality of external-character fonts of the external-character file by using a font selection screen which is used when selecting an external-character font file created corresponding to an external-character font file from among a plurality of external-character files created based on a correspondence relationship between a master font and an external-character font; and an external-character file creating section creating an external-character file of the external-character font selected by the font selecting section 13.

13 Claims, 15 Drawing Sheets

Fig.2

| MASTER CODE | CHARACTER PATTERN (A) |
|---|---|
| 101 | CHARACTER PATTERN OF 「101」 |
| 102 | CHARACTER PATTERN OF 「102」 |
| 103 | CHARACTER PATTERN OF 「103」 |
| ⋮ | ⋮ |
| 65494 | CHARACTER PATTERN OF 「65494」 |

Fig.3A

| MASTER CODE | THIN MING-CHO TYPEFACE / CHARACTER PATTERN |
|---|---|
| 101 | |
| 102 | 、 |
| : | : |
| 458 | ぺ |
| 459 | ほ |
| : | : |
| 1601 | 亜 |
| 1602 | 啞 |
| : | : |
| 11703 | 寸 |
| 11705 | 瀬 |
| : | : |
| 27675 | 跌 |
| 27676 | 跋 |

Fig.3B

| MASTER CODE | THICK MING-CHO TYPEFACE / CHARACTER PATTERN |
|---|---|
| 101 | |
| 102 | 、 |
| : | : |
| 458 | ぺ |
| 459 | ほ |
| : | : |
| 1601 | 亜 |
| 1602 | 啞 |
| : | : |
| 11703 | 寸 |
| 11705 | 瀬 |
| : | : |
| 27675 | 跌 |
| 27676 | 跋 |

Fig.3C

| MASTER CODE | THIN GOTHIC TYPEFACE CHARACTER PATTERN |
|---|---|
| 101 | |
| 102 | 、 |
| : | : |
| 458 | ぺ |
| 459 | ほ |
| : | : |
| 1601 | 亜 |
| 1602 | 啞 |
| : | : |
| 11703 | 寸 |
| 11705 | 瀬 |
| : | : |
| 27675 | 跌 |
| 27676 | 跛 |

Fig.3D

| MASTER CODE | THICK GOTHIC TYPEFACE CHARACTER PATTERN |
|---|---|
| 101 | |
| 102 | 、 |
| : | : |
| 458 | ぺ |
| 459 | ほ |
| : | : |
| 1601 | 亜 |
| 1602 | 啞 |
| : | : |
| 11703 | 寸 |
| 11705 | 瀬 |
| : | : |
| 27675 | 跌 |
| 27676 | 跛 |

Fig.3E

| MASTER CODE | THIN HANDWRITING TYPEFACE |
|---|---|
| | CHARACTER PATTERN |
| 101 | |
| 102 | 、 |
| : | : |
| 458 | ペ |
| 459 | ほ |
| : | : |
| 1601 | 亜 |
| 1602 | 啞 |
| : | : |
| 11703 | 寸 |
| 11705 | 瀬 |
| : | : |
| 27675 | 跌 |
| 27676 | 跛 |

Fig.3F
| Master Code | Character Pattern |
|---|---|
| | (FOR CONFIRMING CHARACTER PATTERN) |
| 101 | |
| 102 | 、 |
| : | : |
| 458 | ぺ |
| 459 | ほ |
| : | : |
| 1601 | 亜 |
| 1602 | 唖 |
| : | : |
| 11703 | 寸 |
| 11705 | 瀬 |
| : | : |
| 27675 | 跌 |
| 27676 | 跛 |
Fig.3G
| SYMBOL | |
|---|---|
| Master Code | Character Pattern |
| : | : |
| 17920 |  |
| 17921 |  |
| 17922 |  |
| : | : |
| 17981 |  |
| 17982 |  |
| 17983 |  |
| 17984 |  |
| : | : |
| 18061 |  |
| 18062 |  |
| 18063 |  |
| : | : |

Fig.4

| EXTERNAL-CHARACTER CODE TABLE ||
|---|---|
| EXTERNAL-CHARACTER CODE (FONT CODE) | MASTER CODE |
| 0xF040 | 10723 |
| 0xF041 | 10562 |
| 0xF042 | 10585 |
| ⋮ | ⋮ |
| 0xF9FC | (UNDEFINED) |

Fig 5A

CHARACTER PATTERN REFERENCE FILE DEFINITION TABLE (I)

| STARTING MASTER CODE | FINISHING MASTER CODE | CHARACTER PATTERN REFERENCE FILE |
|---|---|---|
| 101 | 17899 | DESIGN TYPE |
| 17900 | 18099 | SYMBOL |
| 18100 | 65494 | DESIGN TYPE |

Fig 5B

CHARACTER PATTERN REFERENCE FILE DEFINITION TABLE (II)

| STARTING MASTER CODE | FINISHING MASTER CODE | CHARACTER PATTERN REFERENCE FILE |
|---|---|---|
| 101 | 17899 | DESIGN TYPE |
| 17900 | 18099 | THIN MING-CHO TYPEFACE |
| 18100 | 65494 | DESIGN TYPE |

Fig.6

| EXTERNAL-CHARACTER CODE (FONT CODE) | CHARACTER PATTERN |
|---|---|
| 0xF040 | CHARACTER PATTERN OF 「0xF040」 |
| 0xF041 | CHARACTER PATTERN OF 「0xF041」 |
| 0xF042 | CHARACTER PATTERN OF 「0xF042」 |
| ⋮ | ⋮ |
| 0xF9FC | CHARACTER PATTERN OF 「0xF9FC」 |

Fig.7A THIN MING-CHO TYPEFACE EXTERNAL CHARACTER

| EXTERNAL-CHARACTER (FONT CODE) | CHARACTER PATTERN |
|---|---|
| 0xF040 | 唱 |
| 0xF041 | 唐 |
| 0xF042 | 唱 |

Fig.7B THIN GOTHIC TYPEFACE EXTERNAL CHARACTER

| EXTERNAL-CHARACTER (FONT CODE) | CHARACTER PATTERN |
|---|---|
| 0xF040 | 唱 |
| 0xF041 | 唐 |
| 0xF042 | 唱 |

Fig.7C THIN HANDWRITING TYPEFACE EXTERNAL CHARACTER

| EXTERNAL-CHARACTER (FONT CODE) | CHARACTER PATTERN |
|---|---|
| 0xF040 | 唱 |
| 0xF041 | 唐 |
| 0xF042 | 唱 |

Fig.7D THICK HANDWRITING TYPEFACE EXTERNAL CHARACTER

| EXTERNAL-CHARACTER (FONT CODE) | CHARACTER PATTERN |
|---|---|
| 0xF040 | 唱 |
| 0xF041 | 唐 |
| 0xF042 | 唱 |

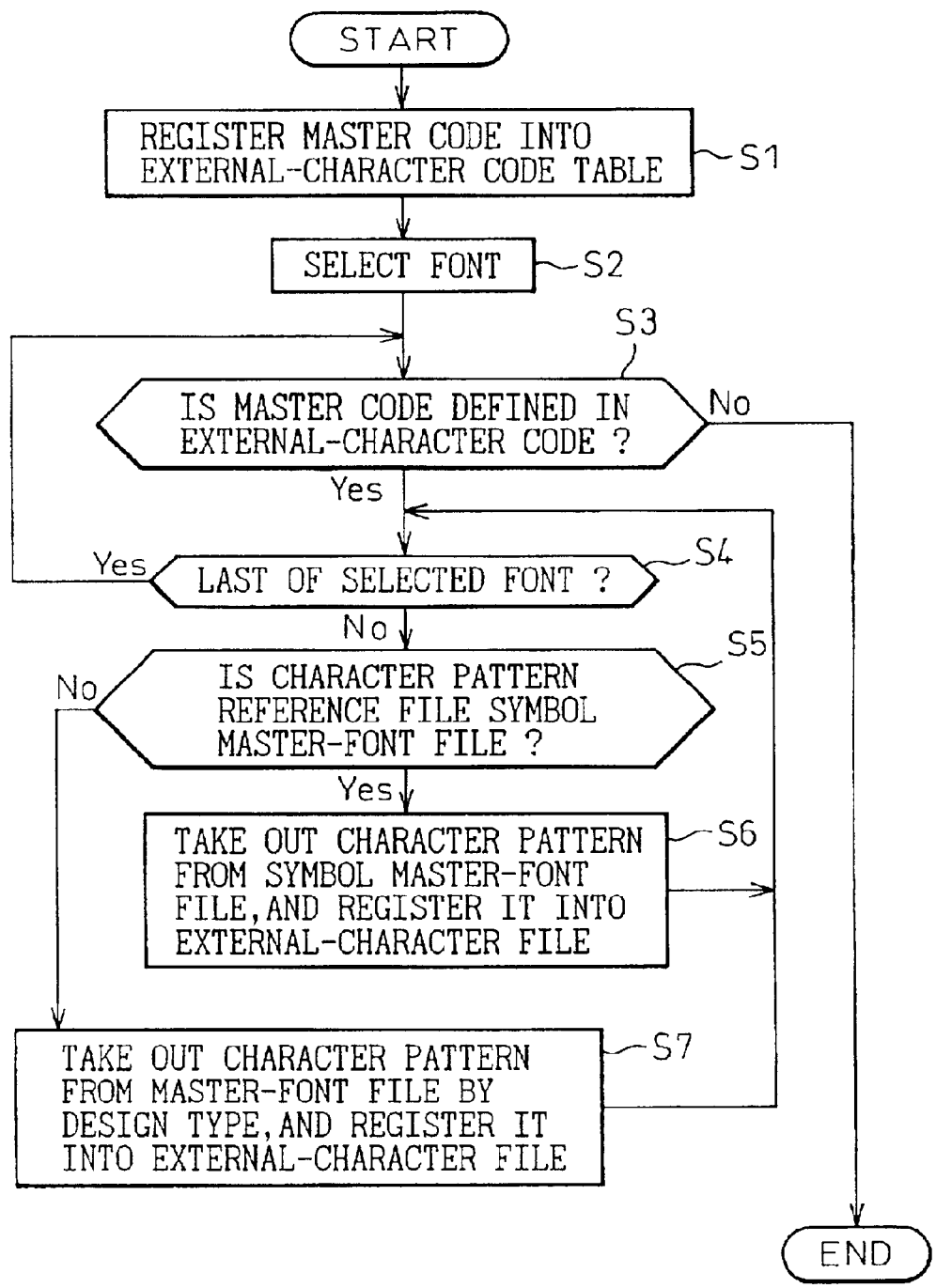

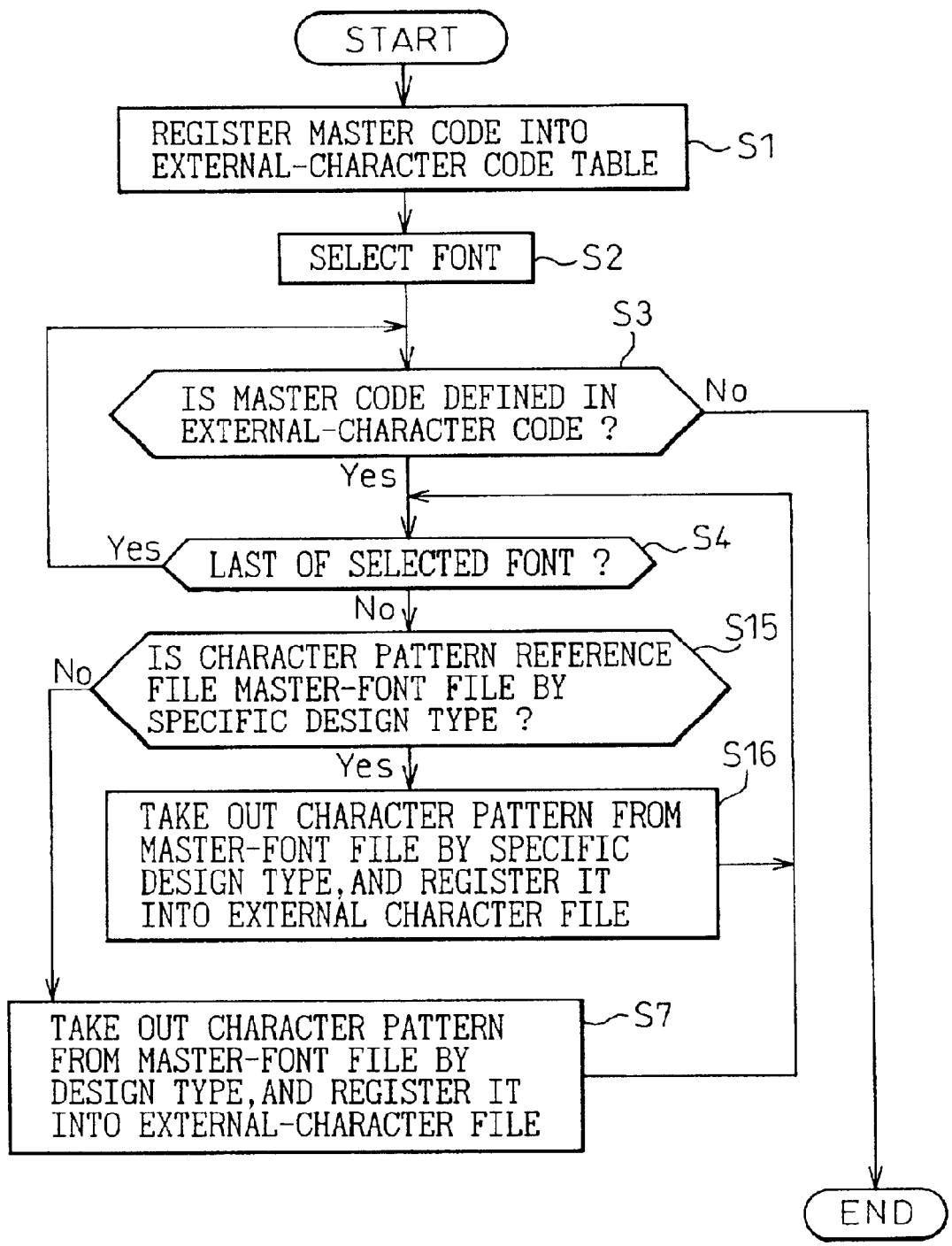

EXTERNAL-CHARACTER FONT CREATION SYSTEM AND PROGRAM RECORDING MEDIUM THEREFOR

BACKGROUND OF THE INVENTION

1. Field of the Invention

The present invention relates to an external-character font creation system, and a program recording medium, capable of registering a plurality of typefaces (fonts) for one external character and of creating an external-character file for each font.

2. Description of the Related Art

In an external-character registration system that uses an OS such as Windows and Linux, a plurality of fonts having different designs can be registered for one external character. The designs of those external-character fonts include types of characters having different shapes such as the Ming-cho typeface, the Gothic typeface, and the Handwriting typeface, and types of characters having different thicknesses such as the thick Ming-cho typeface, the intermediate Ming-cho typeface, and the thin Ming-cho typeface. In the above external-character registration system, it is possible to assign external-character registration for each font. This is because it is necessary to set the same design for both the internal characters and the external characters. For example, when an operator wants to use a predetermined external character in the Gothic typeface after the operator has created this external character in the Ming-cho typeface, it is necessary to create a new external character in the Gothic typeface.

To create an external-character file, there are, for example, the following two methods. One method is to directly edit a font file to be built into a system by using an external-character editor. The other method is to edit a character by using a master file (a format suitable for a font design) and then converting the character into a font file to be built into the system. In the external-character registration system that uses a plurality of external-character fonts, either an external character is edited for each character font, or a character is converted from a master file into an external-character font file for each type of font.

According to the above external-character registration system, when there are many kinds of character fonts to be registered for external characters, it is necessary to edit external characters up to the number of the kinds of these fonts, or to carry out the conversion from the master file to the external-character font file. Therefore, these methods have had a problem that it takes time for the registration operation.

SUMMARY OF THE INVENTION

In the light of the above problem, it is, therefore, an object of the present invention to provide an external-character font creation system and a program recording medium capable of registering a plurality of kinds of fonts for one external character and capable of creating external-character files for each font in a short time.

In order to achieve the above object, according to a first aspect of the present invention, there is provided an external-character font creation system for creating external-character fonts, the external-character font creation system including a display unit displaying an external-character code registration screen based on an external-character code table that shows a correspondence between an external-character code of an external character to be registered and a master code, and an edit unit registering a master code corresponding to an external-character code in the external-character code table.

In the external-character font creation system, the system further includes a font selection screen selecting an external-character font of an external-character file to be created based on a correspondence relationship between a master font and an external-character font, a font selecting section selecting a plurality of external-character fonts of the external-character file by using the font selection screen, and an external-character file creating section creating an external-character file of the external-character font selected by the font selecting section.

In the external-character font creation system, the system further includes a character pattern reference file definition table defining a master-font file in which a character pattern, defined by the master code, is referred to among a plurality of master-font files that are classified into types of designs of external-character fonts.

In the external-character font creation system, the system further includes a character pattern registering section copying a character pattern from a master-font file into an external-character file based on a master code.

In the external-character font creation system, the external-character code table lists character patterns in place of master codes.

In the external-character font creation system, the system further includes a character shape confirmation font file, storing character patterns which makes it possible to confirm character shapes of master codes, as another master font file.

In the external-character font creation system, a master-font file defined within the character pattern reference file definition table is either a master-font file by design type or a symbol master-font file.

In the external-character font creation system, a master-font file defined within the character pattern reference file definition table is either a master-font file by design type or a master-font file of a specific design.

In the external-character font creation system for achieving the above object, an operator first operates to register a master code of a master font into an external-character code of an external-character font on the external-character code registration screen. Next, the operator selects an external-character font to be created on the font selection screen. In this case, the operator can select a plurality of fonts. The operator then depresses an external-character file creation button. As a result, it becomes possible to respectively create external-character files for the selected plurality of external-character fonts at the same time.

Further, in order to achieve the above object, according to a second aspect of the invention, there is provided a program recording medium that is recorded with a program for making a computer create an external-character font, wherein the program recording medium is recorded with a program for making the computer achieve a display function for displaying an external-character code registration screen based on an external-character code table that shows a correspondence between an external-character code of an external character to be registered and a master code, and an edit function for registering a master code corresponding to an external-character code in the external-character code table.

BRIEF DESCRIPTION OF THE DRAWINGS

FIG. 2 is a diagram showing a format of a master-font file relating to an embodiment of the invention.

FIGS. 3A, 3B, 3C, 3D and 3E are diagrams showing examples of character patterns of a respective design format in the thin Ming-cho typeface, the thick Ming-cho typeface, the thin Gothic typeface, the thick Gothic typeface, and the thin Handwriting typeface, corresponding to the respective master font.

FIG. 3F is a diagram showing an example of character patterns of a character shape confirmation master-font file relating to an embodiment of the invention.

FIG. 3G is a diagram showing an example of character patterns of a symbol master-font file relating to an embodiment of the invention.

FIG. 4 is a diagram showing an example of a registration of master codes into an external-character code table relating to an embodiment of the invention.

FIGS. 5A and 5B are diagrams showing character pattern reference file definition tables for defining a reference file of character patterns to be managed by master codes relating to an embodiment of the invention.

FIG. 6 is a diagram showing an external-character font file format relating to an embodiment of the invention.

FIG. 10 is a flowchart of a processing routine in an external-character font creation system relating to a first embodiment of the invention.

FIG. 11 is a flowchart of a processing routine in an external-character font creation system relating to a second embodiment of the invention.

DETAILED DESCRIPTION OF THE PREFERRED EMBODIMENTS

Figure 1:
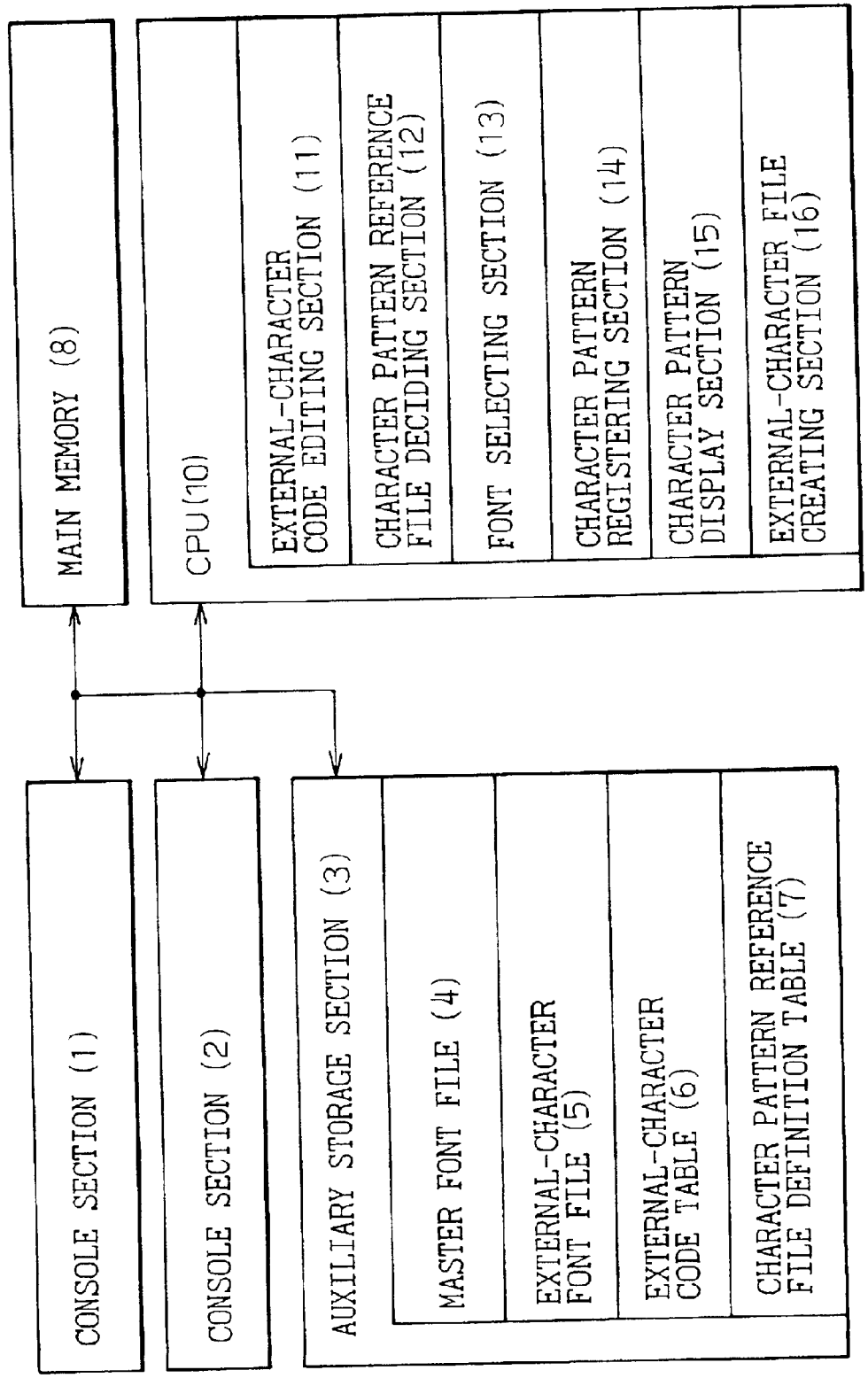
FIG. 1 is a block structure diagram of an external-character font creation system according to the present invention.
Figure 7:
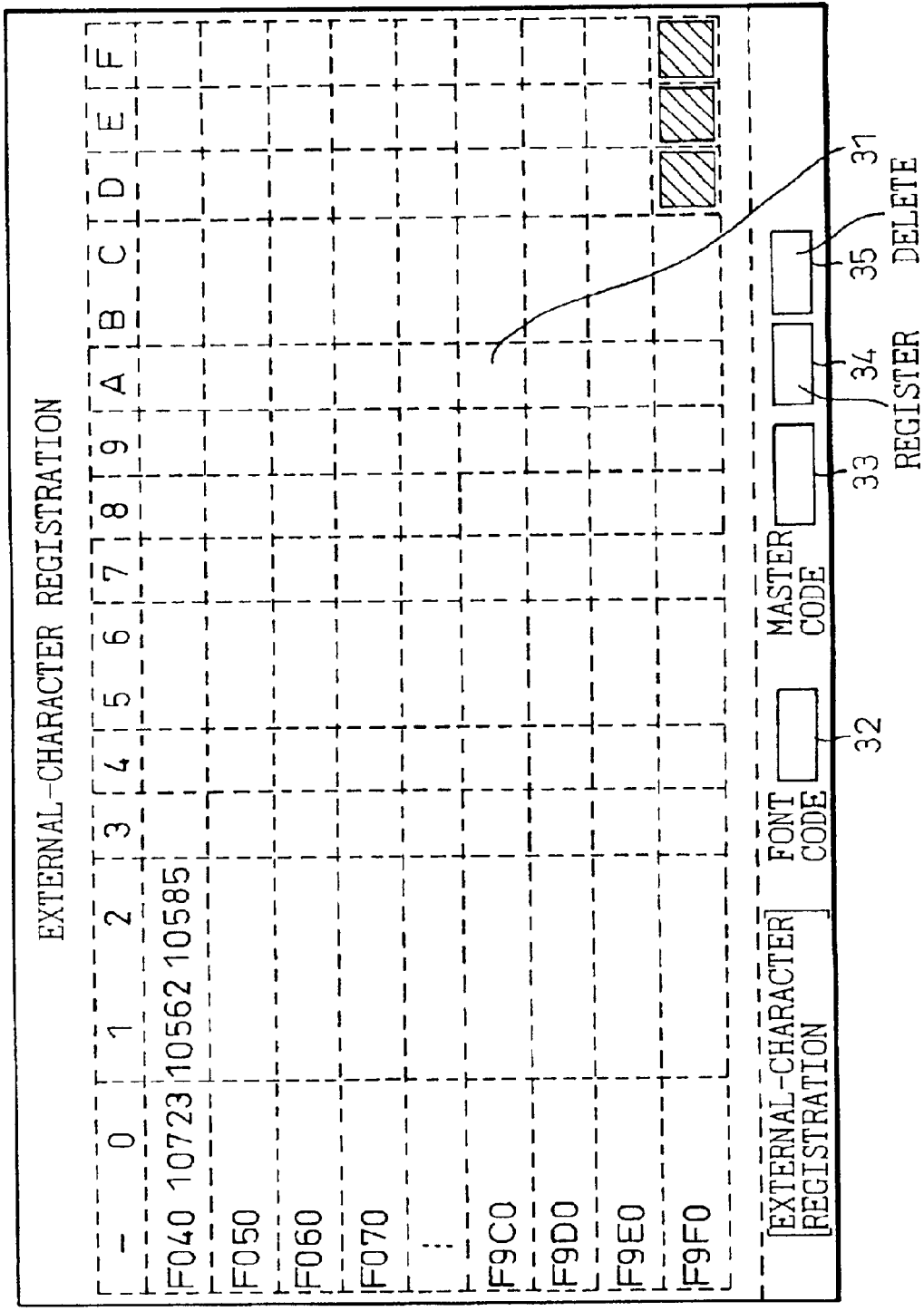
FIGS. 7A, 7B, 7C and 7D are diagrams showing examples of character patterns of respective design format in the thin Ming-cho typeface, the thin Gothic typeface, the thin Handwriting typeface, and the thick Handwriting typeface corresponding to the respective master font.

Embodiments of the present invention will be explained in detail below with reference to the attached drawings. FIG. 1 is a block structure diagram of an external-character font creation system according to the present invention. In FIG. 1, 1 denotes a console section for making an input using a keyboard or a mouse or the like. A reference number 2 denotes a display section like a CRT for displaying an external-character registration screen and a font selection screen. A reference number 3 denotes an auxiliary storage section like a magnetic disk for storing programs, files and tables. The auxiliary storage section 3 stores a master-font file 4, an external-character font file 5, an external-character code table 6, and a character pattern reference file definition table 7.

The master-font file 4 is a file that has master codes and character patterns necessary for registering external characters corresponding to the master codes. The external-character font file 5 is a file created in a file format like True Type and Type 1 that can be displayed by an OS. The external-character code table 6 is a table that lists external-character codes and master codes for defining character patterns to be registered to the master codes. The character pattern reference file definition table 7 is a table that lists information showing whether a master-font file, which a character pattern defined by the master code refers to, is a master-font file by design, a master-font file by symbol or a master-font file by specific design.

Reference number 8 denotes a main memory such as RAM that is a workplace for temporarily reading and writing a program, a file or data of a table, and that temporarily stores a state of an external-character registration operation. Reference number 10 denotes a CPU for executing a processing in the external-character font creation system of the present invention.

The CPU 10 executes functions of an external-character code table editing section 11, a character pattern reference file deciding section 12, a font selecting section 13, a character pattern registering section 14, a character pattern display section 15, and an external-character file creating section 16 respectively. A program for making the CPU execute these functions is normally stored in the auxiliary storage section 3, and is written into the RAM 8 when necessary.

The external-character code table editing section 11 has a function of registering or deleting a master code corresponding to an external-character code in the external-character code table 6. The character pattern reference file deciding section 12 has a function of deciding whether a master-font file, to which a character pattern refers based on the character pattern reference file definition table 7, is a master-font file by design, a master-font file by symbol or a master-font file by specific design. The font selecting section 13 has a function of creating a font selection screen on a display section 2 to be described later. The character pattern registering section 14 has a function of copying a character pattern of the master-font file 4 into the external-character font file 5, and also has a function of converting a character pattern format, when the formats showing the character patterns are different, between the master-font file 4 and the external-character font file 5. The character pattern display section 15 has a function of searching the master-font file 4 stored in the auxiliary storage section 3 for a character pattern that coincides with a master code being processed, and displaying a retrieved result on the screen of the display section 2. The external-character file creating section 16 has a function of creating an external-character file of a plurality of external-character fonts at the same time.

FIG. 2 is a diagram showing a format of a master-font file relating to the embodiment of the invention. A master-font file shown in FIG. 2 stores master codes and a plurality of character patterns (A) in, for example, the thin Ming-cho typeface corresponding to these master codes. This master-font file is created for each font of character patterns shown in FIGS. 3A to 3G respectively. In other words, this master-font file is created for the character patterns (A) in the thin Ming-cho typeface, character patterns (B) in the thick Ming-cho typeface, character patterns (C) in the thin Gothic typeface, character patterns (D) in the thick Gothic typeface, character patterns (E) in the thin Handwriting typeface, character patterns (F) in the character shape confirmation font, and symbol character patterns (G), respectively. Each character pattern is expressed in dot data or is expressed in data of point coordinates of a start point and point coordinates of an end point between coordinates on the outline of each character. A master code is a maker's own code.

FIGS. 3A to 3E are diagrams showing examples of character patterns of a master-font file by design type relating to an embodiment of the invention. FIGS. 3A, 3B, 3C, 3D and 3E are diagrams showing an example of character patterns of respective design format in the thin Ming-cho typeface, the thick Ming-cho typeface, the thin Gothic typeface, the thick Gothic typeface, and the thin Handwriting typeface, corresponding to the respective master font. Each of these master-font files stores character patterns that match the design format of each font according to the format of the master-font file shown in FIG. 2. The master code is a character code that can uniquely determine a character. A master font is a character pattern created according to the master code. Character patterns created based on the thin Ming-cho typeface design format, the thick Ming-cho typeface design format, and the thin Gothic typeface design format are called a thin Ming-cho typeface master font, a thick Ming-cho typeface master font, and a thin Gothic typeface master font respectively.

FIG. 3F is a diagram showing an example of character patterns of a character shape confirmation master-font file relating to the embodiment of the invention. The master-font file shown in FIG. 3F stores character patterns that match the design formats in fonts useful for confirming the shapes of characters according to the formats of the master-font file shown in FIG. 2. For this character shape confirmation master-font file, there may be used a master-font file of character patterns in the design format of the thin Gothic typeface (FIG. 3C).

FIG. 3G is a diagram showing an example of character patterns of a symbol master-font file relating to the embodiment of the invention. The master-font file shown in FIG. 3G stores symbol patterns according to the formats of the master-font file shown in FIG. 2. For this symbol master-font file, there may be used any one or a plurality of master-font files by design type, shown in FIGS. 3A to 3E, as described later.

FIG. 4 is a diagram showing an example of registration of master codes into an external-character code table relating to the embodiment of the invention. This is a table that lists master codes for assigning character patterns to be stored corresponding to font codes (also referred to as external-character codes) of external characters to be registered. In FIG. 4, master codes 10723, 10562, 10585, etc. are registered to external-character codes F040, F041, F042, etc. respectively. An external-character code F9FC shows that a master code is in an undefined state where no master code has been registered yet. In the undefined case, an unused master code is used.

FIGS. 5A and 5B are diagrams showing character pattern reference file definition tables for defining a reference file of character patterns to be managed by master codes relating to the embodiment of the invention. FIG. 5A is a diagram that shows a definition table for defining whether the character pattern should refer to the master-font file by design type or the symbol master-font file. FIG. 5B is a diagram that shows a definition table for defining whether the character pattern should refer to the master-font file by design type or the master-font file by specific design. These character pattern reference file definition tables are used for making a decision about whether the character pattern assigned by the master code should refer to the master-font file by any one of the design type master-font files or to the symbol master-font file. In FIG. 5A, it is defined that the character pattern should refer to the master-font file by design type when the master codes are from 101 to 17899, the character pattern should refer to the symbol master-font file when the master codes are from 17900 to 18099, and the character pattern should refer to the master-font file by design type when the master codes are 18100 to 65494. FIG. 5B is different from FIG. 5A in that it is defined in FIG. 5B that the character pattern should refer to the master-font file of a predetermined design format, such as, for example, the thin Ming-cho typeface, instead of the symbol master-font file, when the master codes are from 17900 to 18099.

FIG. 6 is a diagram showing an external-character font file format relating to the embodiment of the invention. The external-character font file shown in FIG. 6 stores external-character codes and a plurality of character patterns corresponding to these external-character codes. The external-character font file of this embodiment is a file suitable for use in an application program, that is operated under the OS, such as a word processor.

FIGS. 7A to 7D are diagrams showing examples of character patterns simultaneously created in an external-character font file relating to the embodiment of the invention. FIGS. 7A, 7B, 7C and 7D are diagrams showing examples of character patterns of respective design formats in the thin Ming-cho typeface, the thin Gothic typeface, the thin Handwriting typeface, and the thick Handwriting typeface corresponding to the respective master font. These character patterns are simultaneously created by matching the design formats of the external-character fonts of the thin Ming-cho typeface shown in FIG. 7A, the thin Gothic typeface shown in FIG. 7B, the thin Handwriting typeface shown in FIG. 7C, and the thick Handwriting typeface shown in FIG. 7D respectively, according to the format shown in FIG. 6 based on the present invention. These character patterns are then stored in the external-character file 4 of the auxiliary storage section 3.

Figure 8:
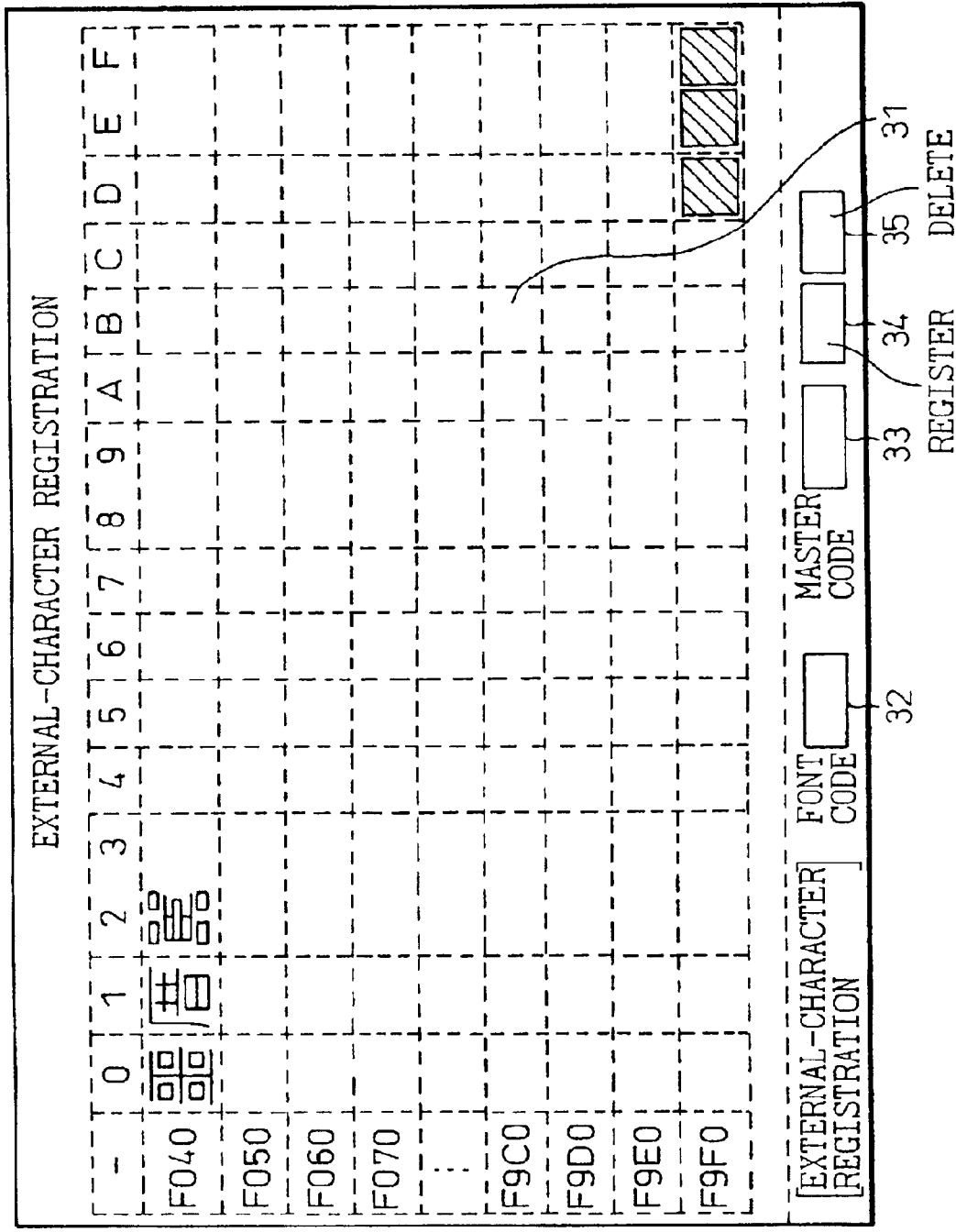
FIG. 8A is a diagram showing an external-character code registration screen (I) that displays a list of master codes relating to an embodiment of the invention.
FIG. 8B is a diagram showing an external-character code registration screen (II) that displays a list of character patterns of a character shape confirmation font file relating to an embodiment of the invention.

FIGS. 8A and 8B are diagrams showing external-character code registration screens relating to the embodiment of the invention. FIG. 8A is a diagram showing an external-character code registration screen (I) that displays a list of master codes, and FIG. 8B is a diagram showing an external-character code registration screen (II) that displays a list of character patterns of a character shape confirmation font file. FIG. 8A displays a list of master codes corresponding to registered external-character codes, and FIG. 8B displays a list of character patterns corresponding to registered external-character codes. The screens shown in FIGS. 8A and 8B can be mutually switched. Normally, the screen shown in FIG. 8A is displayed. When the operator wants to look at the external-character character patterns corresponding to the master codes, the operator switches the screen to that shown in FIG. 8B.

In FIGS. 8A and 8B, reference number 31 denotes one cell. Each cell 31 in FIG. 8A displays a master code, and each cell 31 in FIG. 8B displays a character pattern. Reference number 32 denotes a font-code edit box for assigning an external-character code of the external-character code table (FIG. 4). The operator inputs an external-character code to this box. Reference number 33 denotes a master-code edit box for assigning a master code to be registered in the external-character code table. The operator inputs a master code to this box. Reference number 34 denotes a registration button that is clicked with the mouse for registering an external character into the external-character code table. Reference number 35 denotes a delete button that is clicked with the mouse for deleting an external character from the external-character code table.

Figure 9:
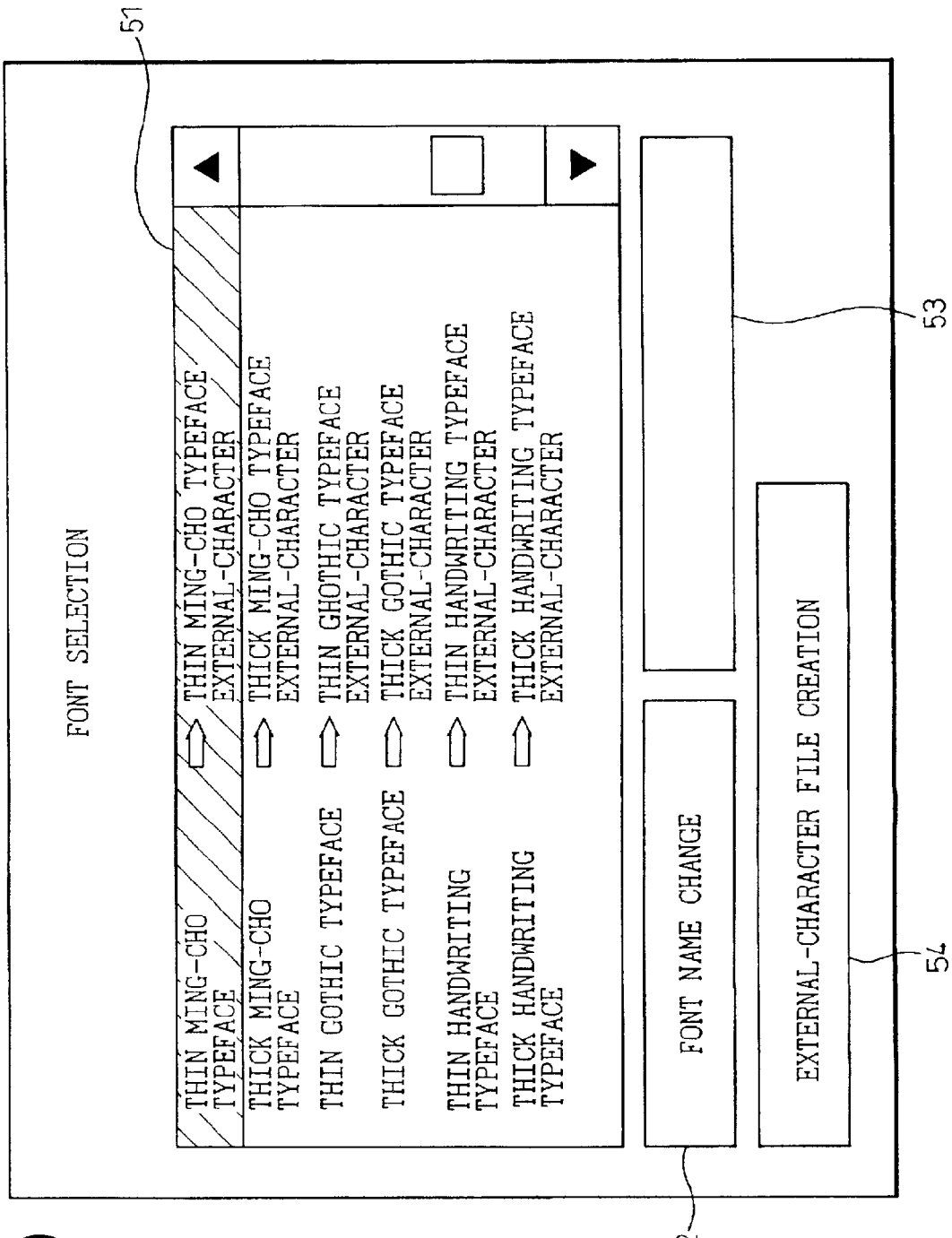
FIG. 9 is a diagram showing a font selection screen relating to an embodiment of the invention.

FIG. 9 is a diagram showing a font selection screen relating to the embodiment of the invention. In FIG. 9, a reference number 51 denotes a list display window that lists font names for identifying master fonts and font names of external-character font files to be created corresponding to these font names by type of design of the master-font file. The display contents within this list display window can be moved up and down with a scroll bar at the right side. A font name selected with the mouse or keyboard operation is displayed in reversed characters. A reference number 52 denotes a font-name change button that is clicked with the mouse for changing a font name. A reference number 53 denotes a font-name edit box that is filled by the operator when the operator assigns a font name of an external-character font file. A reference number 54 denotes an external-character file creation button for executing the creation of an external-character font file corresponding to a font name selected within the list display window.

The operating procedure of the external character registration in the external-character font creation system according to the present invention shown in FIG. 1 will be explained below.

FIG. 10 is a flowchart of a processing routine in the external-character font creation system relating to a first embodiment of the invention. In FIG. 10, a number following S denotes a step number. An operator first defines a character pattern of an external-character code. At step S1, the operator registers a master code into the external-character code table (FIG. 4). The operator registers the master code by looking at the external-character code registration screen shown in FIG. 8A. The operator inputs an external-character code for the registration of the external character into the font-code edit box 32. The operator enters the master code for assigning the character pattern for the registration of the external character into the master-code edit box 33. The operator clicks the registration button 34 with the mouse. Then, the registration of the external character is started. Based on the starting of this registration, the external-character code table editing section 11 shown in FIG. 1 stores the external-character code and the master code that have been input to the external-character code table 6 shown in FIG. 1. The operator repeats the above operation for each of the external characters that the operator wants to register.

In the mean time, at the time of registering a master code into the external-character code table at step S1, the operator can also register the master code in a similar manner to the above by looking at the external-character code registration screen shown in FIG. 8B. Based on the starting of this registration, the external-character code table editing section 11 shown in FIG. 1 stores the external-character code and the master code that have been input to the external-character code table 6 shown in FIG. 1. The character pattern display section 15 shown in FIG. 1 selects a character pattern that matches the master code under processing from among the character shape confirmation master fonts that have been stored in the auxiliary storage section 3. The character pattern display section 15 then displays this character pattern on the screen of the display section 2 shown in FIG. 1. The operator repeats the above operation for each of the external characters that the operator wants to register. After finishing the editing of the external-character code table at step S1, the process proceeds to step S2.

Next, at step S2, the operator selects a font. The operator selects a font, by relating the master font to the external-character font to be created and by assigning a master file for creating the external-character file, by looking at the font selection screen shown in FIG. 9. The correspondence of the master font to the external-character font to be created is expressed by a notation method of "master font → external-character font" as shown in FIG. 9. When a correspondence item is selected within the list display window by using an input device such as a mouse, the selected item is displayed in reversed characters to indicate that this item is in the selected state. It is also possible to select a plurality of items at the same time. This selection state is temporarily stored in the main memory section 8 shown in FIG. 1. The external-character file creation processing at steps S3 to S7 is executed by clicking the external-character file creation button 54 shown in FIG. 9 with the mouse. The external-character file creation processing by the external-character file creating section 16 shown in FIG. 1 is executed by sequentially referring to the external-character codes in the external-character code table.

At step S3, a decision is made whether the master code has been defined in the external-character code or not. Specifically, the master codes stored in the external-character codes are taken out sequentially from the external-character code table (FIG. 4), and a decision is made whether the extracted master code has been defined or not. When a decision has been made that the extracted master code has not been defined yet, an optional code is allocated to this master code. For example, when the undefined code is set to "0", no character pattern exists in the master code "0" of the master file. Therefore, steps S4 to S7 are repeated for the number of characters that have been registered for the external character. When a result of the decision made at step S3 is YES, the process proceeds to step S4. When a result of the decision made at step S3 is NO, this routine finishes. When an external-character code to be registered for the external character has been determined at step S3, a character pattern is registered at steps S4 to S7 in the master file unit for which the font has been selected.

At step S4, a decision is made whether the font is the last font selected or not. Steps S5 to S7 are looped by the selected number of fonts. When a result of the decision made at step S4 is YES, the process returns to steps S3. When a result of the decision made at step S4 is NO, the process proceeds to step S5.

At step S5, a decision is made whether a master-font file that the character pattern refers to is the master-font file by design type or the symbol master-font file. Specifically, after the master file as the registration origin of the character pattern and the external character as the registration destination have been determined at step S4, a decision is made at step S5 whether the master-font file that the character pattern of the master code determined at step S3 refers to is the master-font file by design type or the symbol master-font file. At step S5, a row to which the master code belongs is checked in the character pattern reference file definition table shown in FIG. 5A. For example, when the master code is "10723", this master code exists between the starting master code "101" and the finishing master code "17899", and therefore, the master-font file that the character pattern refers to is the master-font file "by design type". When the master code is "17981", this master code exists between the starting master code "17900" and the finishing master code "18099", and therefore, the master-font file that the character pattern refers to is the "symbol" master-font file. When a result of the decision made at step S5 is the "symbol" master-font file, the process proceeds to step S6. When a result of the decision made at step S5 is the master-font file "by design type", the process proceeds to step S7.

At step S6, a character pattern is taken out from the symbol master-font file, and this character pattern is registered into the external-character file. Specifically, the character pattern of the master code under processing is taken out from the symbol master-font file, and this character pattern is copied into the external-character code of the external-character file under processing.

At step S7, the character pattern is taken out from the master-font file by design type, and this character pattern is registered into the external-character file. Specifically, the character pattern of the master code under processing in the master file determined at step S4 is taken out, and this character pattern is copied into the external-character code of the external-character file under processing.

Next, the operation procedure of the external-character registration in the external-character font creation system of the present invention will be explained below for the case of storing a symbol font into any one of the plurality of master-font files by design type as shown in FIGS. 3A to 3E and the character shape confirmation master-font file as shown in FIG. 3F instead of creating the symbol master-font file shown in FIG. 3G.

FIG. 11 is a flowchart of a processing routine in the external-character font creation system relating to a second embodiment of the invention. In FIG. 11, a number following S shows a step number. The processing at steps S1 to S4 and S7 is the same as that of the first embodiment shown in FIG. 10, and therefore, an explanation will be omitted. Only steps S15 and S16 will be explained below.

At step S15, a decision is made whether a master-font file that a character pattern refers to is the master-font file by design type or the master-font file by specific design type. Specifically, after the master file as the registration origin of the character pattern and the external character as the registration destination have been determined at step S4, a decision is made at step S15 whether the master-font file that the character pattern of the master code determined at step S3 refers to is the master-font file by design type or the master-font file by specific design type. At step S15, a row to which the master code belongs is checked in the character pattern reference file definition table shown in FIG. 5B. For example, when the master code is "10723", this master code exists between the starting master code "101" and the finishing master code "17899", and therefore, the master-font file that the character pattern refers to is the master-font file "by design type". When the master code is "17981", this master code exists between the starting master code "17900" and the finishing master code "18099", and therefore, the master-font file that the character pattern refers to is the master-font file "by specific design type". In the present embodiment, the master-font file becomes the "thin Ming-cho typeface". When a result of the decision made at step S15 is the master-font file "by specific design type", the process proceeds to step S16. When a result of the decision made at step S15 is the master-font file "by design type", the process proceeds to step S7.

At step S16, the character pattern is taken out from the master-font file by specific design type, and this character pattern is registered into the external-character file. Specifically, the character pattern of the master code under processing is taken out from the "thin Ming-cho typeface master-font file", and this character pattern is copied into the external-character code of the external-character file under processing.

Next, a method of installing a program recording medium to be used in the external-character font creation system of the present invention into this system will be explained.

In the external-character font creation system, as a computer system, shown in FIG. 1, this system further incorporates a CD-ROM drive, a flexible disk drive (FDD), and a modem or a LAN interface for making access to the database connected to the communication lines like a LAN or WAN, not shown. These units are connected to the CPU 10 via a bus.

A program of the present invention is stored in a portable recording medium such as a CD-ROM or a flexible disk (FD), or in the database connected to the CPU via a communication line by using a modem or a LAN interface. This program is installed in the computer system for the execution of this program. The installed program is stored in the hard disk within the auxiliary storage section 3. The program is then written into the RAM of the main memory section 8, and is executed by the CPU 10.

The program recording medium of the present invention includes a portable recording medium such as a CD-ROM or an FD, a recording device such as a hard disk that is equipped inside or outside the computer system, a storage unit of a database held by other computer system or a server connected via the communication line, and a transmission medium on the communication line.

What is claimed is:

1. A method, comprising:

storing a master font code scheme comprising different master character codes associated with respective different master graphic character patterns;

providing a graphical user interface building and storing an external font code scheme by interactively assigning different of the master character codes to respective different external character codes of the external font code scheme; and processing the external font code scheme to build a font file for the external font code scheme, the processing using the master character codes in the external font code scheme to find corresponding master graphic character patterns in the master font code scheme and writing the external character codes and the found corresponding master graphic character patterns into the font file for the external font code scheme.

2. The method according to claim 1, wherein the graphical user interface builds different external font code schemes with different corresponding sets of external character codes and respective assigned master character codes, and wherein the processing builds font files for the respective different external font code schemes.

3. The method according to claim 2, wherein the different font files correspond to different font formats displayable by an operating system.

4. The method according to claim 1, wherein the same master font code scheme and its master graphic patterns build different external font code schemes and corresponding font files using the master graphic patterns of the master font code scheme.

5. An external-character font creation system for creating external-character fonts from master fonts that comprise master codes, the external-character font creation system comprising:

a display unit displaying an external-character code registration interface screen registering various of the master codes into an external-character code table that shows a correspondence between master codes and respective external-character codes of external characters;

an edit unit registering a one of the master codes corresponding to one of the external-character codes in the external-character code table;

a font selection screen which is used when selecting a font for an external-character font file from among a plurality of fonts based on a correspondence relationship between one of the master fonts and one of the external character fonts;

a font selecting section selecting a plurality of the fonts for insertion into the external-character font file by using the font selection screen; and an external-character font file creating section creating the external-character font file for each of the fonts selected using the font selecting section.

6. The external-character font creation system according to claim 5, the external-character font creation system further comprising a character pattern reference file definition table defining a master-font file, wherein character patterns defined by the master codes refer to the master-font file that is classified into types of designs of character fonts.

7. The external-character font creation system according to claim 6, the external-character font creation system further comprising a character shape confirmation font file storing character patterns to confirm character shapes of the master fonts.

8. The external-character font creation system according to claim 6, wherein the master-font file defined within the character pattern reference file definition table is either a master-font file by design type or a symbol master-font file.

9. The external-character font creation system according to claim 6, wherein the master-font file defined within the character pattern reference file definition table is either a master-font file by design type or a master-font file of a specific design.

10. The external-character font creation system according to claim 5, the external-character font creation system further comprising a character pattern registering section copying a character pattern defined by one of the master codes from a master-font file into the external-character font file, using the external-character code registration interface screen.

11. The external-character font creation system according to claim 5, wherein character patterns are listed in the external-character code table.

12. A program recording medium recorded with a program for making a computer create external-character fonts from master fonts that comprise master codes, and making the computer perform a process, the process comprising:

a display function of displaying an external-character code registration interface screen registering various of the master codes into an external-character code table that shows a correspondence between master codes and respective external-character codes of external characters;

an edit function of registering one of the master codes corresponding to one of the external-character codes in the external-character code table;

a first font selection function selecting a font for an external-character font file from among a plurality of fonts based on a correspondence relationship between one of the master fonts and one of the external character fonts;

a second font selecting function selecting a plurality of the fonts for insertion into the external-character font file by using the first font selection function; and an external-character font file creating function creating the external-character font file for each of the fonts selected using the second font selecting function.

13. The program recording medium according to claim 12, wherein the process further comprises:

character pattern reference file definition table creation function defining a master-font files, wherein character patterns defined by the master codes refer to the master-font file that is classified into types of designs of character fonts.

* * * * *

UNITED STATES PATENT AND TRADEMARK OFFICE
CERTIFICATE OF CORRECTION

PATENT NO. : 6,950,992 B2 Page 1 of 1
APPLICATION NO. : 09/817224
DATED : September 27, 2005
INVENTOR(S) : Kaoru Shimamura It is certified that error appears in the above-identified patent and that said Letters Patent is hereby corrected as shown below:

Column 10, line 63, after "registering" delete "a".

Column 11, line 2-3, change "external character" to --external-character--.

Column 11, line 34, change "file," to --file--.

Column 12, line 6, change "codes," to --codes--

Column 12, line 20, change "external character" to --external-character--.

Column 12, line 30, insert --a-- before "character"

Column 12, line 31, change "files," to --file,--.

Signed and Sealed this

Twelfth Day of September, 2006

JON W. DUDAS
*Director of the United States Patent and Trademark Office*